H. C. J. SCHARMANN.
FASTENER FOR VESSEL TOPS.
APPLICATION FILED APR. 2, 1910.
968,606.
Patented Aug. 30, 1910.
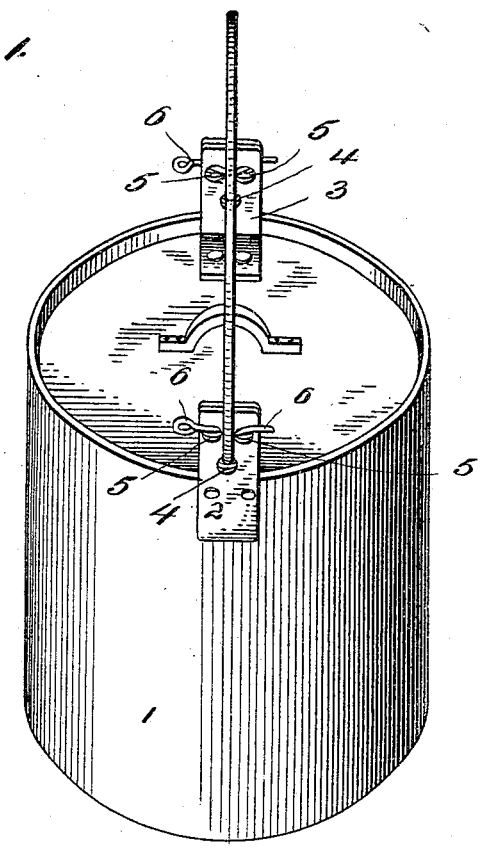
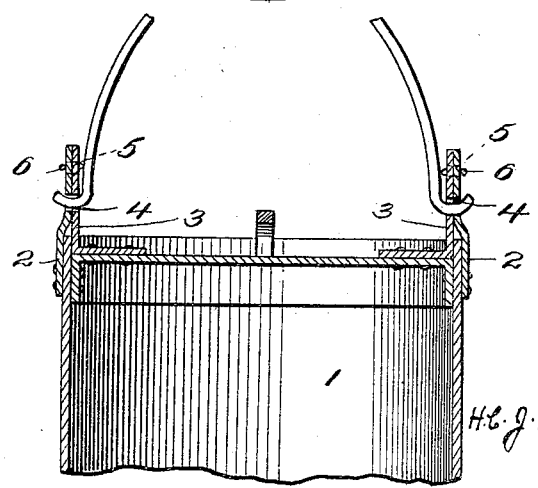

UNITED STATES PATENT OFFICE.

HENRY C. J. SCHARMANN, OF CHAMPION CITY, MISSOURI.

FASTENER FOR VESSEL-TOPS.

968,606.   Specification of Letters Patent.   Patented Aug. 30, 1910.

Application filed April 2, 1910. Serial No. 553,133.

*To all whom it may concern:*

Be it known that I, HENRY C. J. SCHARMANN, a citizen of the United States, residing at Champion City, in the county of Franklin and State of Missouri, have invented a new and useful Fastener for Vessel-Tops; and I do hereby declare the following to be a full, clear, and exact description of the invention, such as will enable others skilled in the art to which it appertains to make and use the same.

The invention relates to a top or cover for buckets, tubs and the like, or square containers.

The essential features of my invention consist in a top or cover having one ear or more on each side to correspond with the ears that are fixed to the bucket or tub.

In this invention I will describe the members as relating to a bucket, and it will be understood that these members are equally applicable to other vessels.

With these and other objects in view, the invention consists in the novel construction and arrangement of parts hereinafter described and shown and particularly pointed out in the claim.

In the drawings:—Figure 1 is a perspective view of a bucket and cover constructed in accordance with this invention. Fig. 2 is a vertical sectional view.

Referring to the drawings, 1 designates a bucket which is provided with ears 2, one on each side thereof. Opposite each of these ears, is an ear 3, which ears 3 are fixed to the top of the cover, each ear of the cover facing an ear 2 of the bucket 1, thus forming a pair. Each pair of ears is provided with three apertures, the lower ones 4 of which are designed to receive the hooked ends of a handle, by which the vessel or bucket is carried.

The upper part of each ear is provided with a pair of apertures 5 adapted to receive a wire for firmly locking the ears in engagement with each other. When it is desired to remove the top, the handle must first be unhooked, and then the flexible locking member 6 must be removed from the apertures 5, which will permit the top to be removed.

What is claimed is:—

The combination of a vessel and a removable top, said top having an ear on each side and secured thereto, said vessel having an ear on each side near the upper periphery of the vessel, said ears being designed to be placed in registration and provided with pairs of registering apertures near their upper ends and having registering apertures below the first named apertures and flexible members interlaced through the pairs of first named apertures, and a handle having free hooked ends engaging through the registering apertures below the first named apertures, said hooked ends being adapted to be disengaged from the ears when pressed inwardly.

In testimony whereof I have signed my name to this specification in the presence of two subscribing witnesses.

HENRY C. J. SCHARMANN.

Witnesses:
 EMIL MUELLER,
 ANNA MUELLER.